United States Patent [19]

Negishi

[11] Patent Number: 4,925,292

[45] Date of Patent: * May 15, 1990

[54] FRAME FOR MULTIFOCAL SPECTACLES

[76] Inventor: Tohru Negishi, 264-2, Bonsai-cho, Ohmiya-shi, Saitama-ken, Japan

[*] Notice: The portion of the term of this patent subsequent to Aug. 29, 2006 has been disclaimed.

[21] Appl. No.: 338,934

[22] Filed: Apr. 11, 1989

Related U.S. Application Data

[62] Division of Ser. No. 133,489, Dec. 15, 1987, Pat. No. 4,861,151.

[30] Foreign Application Priority Data

Dec. 26, 1986 [JP] Japan .............................. 61-198840
Oct. 12, 1987 [JP] Japan .............................. 62-254709

[51] Int. Cl.⁵ .............................................. G02C 5/04
[52] U.S. Cl. ..................................... 351/128; 351/137
[58] Field of Search ............... 351/128, 126, 130, 131, 351/137

[56] References Cited

FOREIGN PATENT DOCUMENTS 53-986  1/1978 Japan .
55-2404 1/1980 Japan .

Primary Examiner—P. M. Dzierzynski
Attorney, Agent, or Firm—Wenderoth, Lind & Ponack

[57] ABSTRACT

The inner sides of left and right lens rims constituting the main body of a frame for multifocal spectacles are provided with respective guide portions extending downwardly from a bridge connecting the rims together. Left and right nose-pads of a nose-pad member are secured in the guide portions under tension using left and right resilient pieces configured to gradually curve away from each other. This makes it possible to move the nose-pads up and down smoothly and reliably.

1 Claim, 7 Drawing Sheets

FRAME FOR MULTIFOCAL SPECTACLES

This is a Rule 1.60 divisional application of Ser. No. 133,489, now Pat. No. 4,861,151, filed Dec. 15, 1987.

This invention relates to a frame for multifocal spectacles so adapted that lens rims can be moved vertically by a simple operation while the spectacles are being worn so that whichever segment of the lens combination is used can be brought to the appropriate height.

A frame for multifocal spectacles so adapted that lens rims can be moved vertically is known in the art, as described, for example, in the specification of Japanese Utility Model Publication No. 53-986. Specifically, the frame includes a pair of lens rims and a central bridge connecting the lens rims together at the central portions thereof, the inner side of the central bridge having two longitudinal grooves facing each other. A resilient piece having an overall inverted U-shaped configuration has a nose-pad attached to each of its two lower ends, and the left and right legs of the resilient piece are fitted into the respective longitudinal grooves of the central bridge. Each of the grooves is provided with two or more locking recesses located one above the other, and each of the two legs of the resilient piece is formed to include a projection shaped to exactly fit these recesses.

The two legs of the resilient piece are provided with a small elastic force acting in directions to spread the legs apart. The vertical movement of the resilient piece is accomplished by grasping the two nose pads with a thumb and finger to reduce the spacing between the two legs, moving the resilient piece up or down as desired until the projections on the legs fit into suitable ones of the recesses provided in the longitudinal grooves, and then releasing the nose-pads by removing the thumb and finger. If the spectacles are worn in a state where the resilient piece is supported at an upper position relative to the lens rims, namely in a state where the nose-pads are supported at an upper position relative to the lens rims, then the lens rims will be at their lowered positions, which is the state suitable for looking into the distance. If the spectacles are worn in a state where the resilient piece and, hence, the nose-pads, is supported at a lower position relative to the lens rims, then the latter will be at their raised position, which is the state suitable for looking at an object close up.

Another example of a frame for spectacles is described in the specification of Japanese Utility Model Publication No. 55-2404 and is directed to bifocal spectacles. The frame includes left and right lens rims, small cylinders attached to the opening faces of these lens rims so as to extend vertically, and a slide piece having a generally inverted U-shaped configuration, with the two legs of the slide piece being inserted into respective ones of the two cylinders. Each cylinder is elliptical in shape, with the major diameter of the ellipse at the upper, open end of the cylinder being larger than that at the lower, open end thereof. The rearward rim of the upper, open end portion of the cylinder is provided with a forwardly directed locking portion. A nose-pad is attached to the lower end of each of the two legs of the slide piece.

When the slide piece is lowered relative to the lens rims, the upper end of the slide piece engages the locking portions of the cylinders, whereby the slide piece is prevented from moving upward. This is the state suitable for using the close-up lens segments of the two lenses. If the lens segments for distance viewing are to be used, the lower parts of the lens rims are moved forward slightly to disengage the upper end of the slide piece from the locking portions, then the slide piece is raised relative to the lens rims. The lower ends of the slide piece butt against the lower ends of the cylinders to limit any further ascent of the slide piece. This is the state for looking into the distance. The lens rims need merely be lifted to lower the slide piece again. If the slide piece descends relative to the lens rims under its own weight and the spectacles are worn at such time, the wearer's face will press against the nose-pads, causing the upper end of the slide piece to re-engage the locking portions.

The frame for multifocal spectacles disclosed in Japanese Utility Model Publication No. 53-986 is disadvantageous in terms of the troublesome operation involved. Specifically, though the resilient piece is moved up and down by grasping and squeezing the two nose-pads, the nose-pads cannot be grasped when the spectacles are being worn. Consequently, when it is desired to move the resilient piece vertically, it is required to take off the frame each time, move the resilient piece up or down and then put the frame back on. This is a very troublesome task.

The bifocal spectacles described in Japanese Utility Model Publication No. 55-2404 also have a number of drawbacks. First, the operation through which the slide piece is lowered relative to the lens rims to engage the locking portions is a very difficult one. Locking the slide piece easily without fail and without error every time is nearly impossible. Since sure locking cannot be achieved with ease, these spectacles in all likelihood will have little commercial value.

Even if the slide piece can manage to be engaged with the locking portions with facility, great difficulty is involved in maintaining the locked state stably. The face of an individual wearing glasses is moving constantly and, as a result, sometimes the lens rims slide down the face and must be raised again on each such occasion. There is the danger that the slide piece will slip out of the locking portions whenever the lens rims are raised. Though the locking portions can be designed to make it difficult for the slide piece to slip out, this will also make it more difficult to engage the slide piece with the locking portions.

Furthermore, the stability with which the slide piece is held raised relative to the lens rims is poor. Since the lens rims and nose-pads are not integrated into a unitary body, the nose-pads shift or deviate whenever the wearer's face moves or the spectacle frame is taken off and put back on. The result is that the spectacles cannot be worn comfortably.

It may be possible to prevent shifting or deviations in a direction other than the vertical direction if play is eliminated between the legs of the slide piece and the cylinders. With such an expedient, however, it will no longer be possible to move the slide piece up and down smoothly. In any case, a fair amount of play is required between the legs and cylinders, for otherwise vertical movement would become impossible should the cylinders become clogged with dust or oil. Consequently, considerable looseness or instability of the frame prevails regardless of whether the spectacles are being used for distance or close-up viewing. As a result, comfort during wearing is sacrificed.

This example of the prior art also is troublesome to manipulate, exhibits unsure operation and is uncomfortable when worn.

Accordingly, an object of the invention is to provide a frame for multifocal spectacles which is comfortable to wear, reliable and easy to operate and, at the same time, which enables the lens rims to be moved up and down.

The foregoing problems encountered in the prior art are solved by a frame for multifocal spectacles in accordance with the present invention as illustrated in the drawings, in which.

Figure 5A:
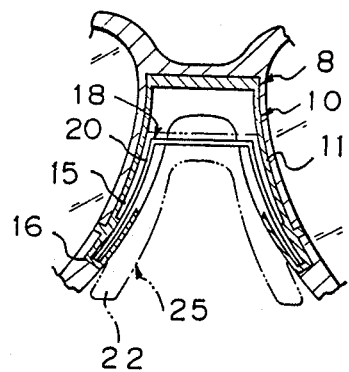
Figure 5B:
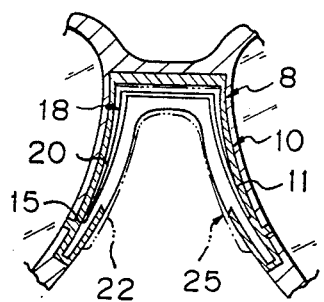
Figure 6:
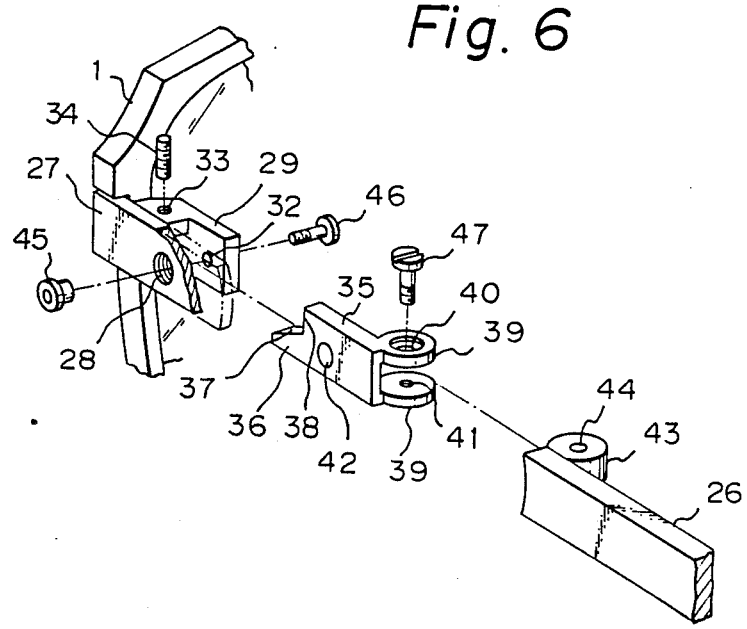
Figure 7:
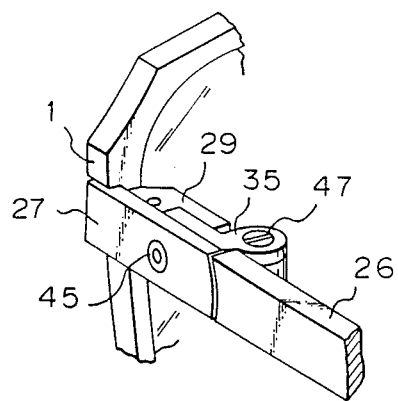
Figure 8:
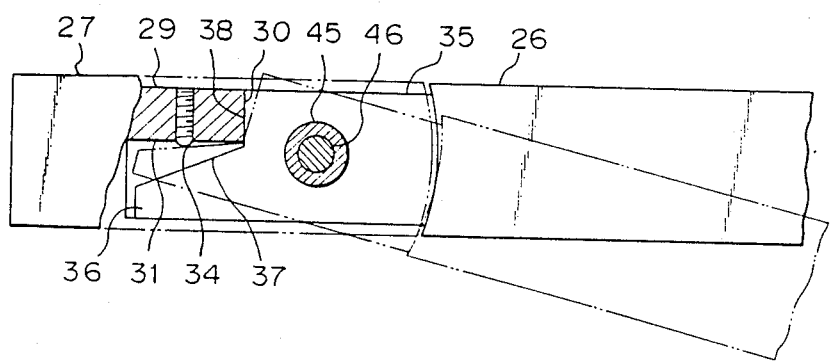
Figure 9A:
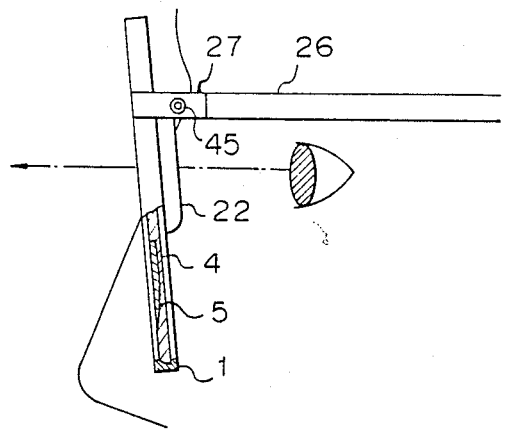
Figure 9B:
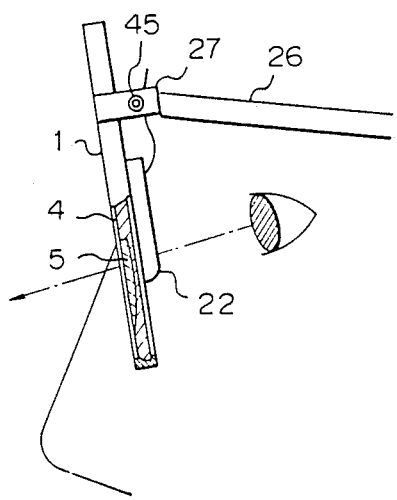
Figure 10:
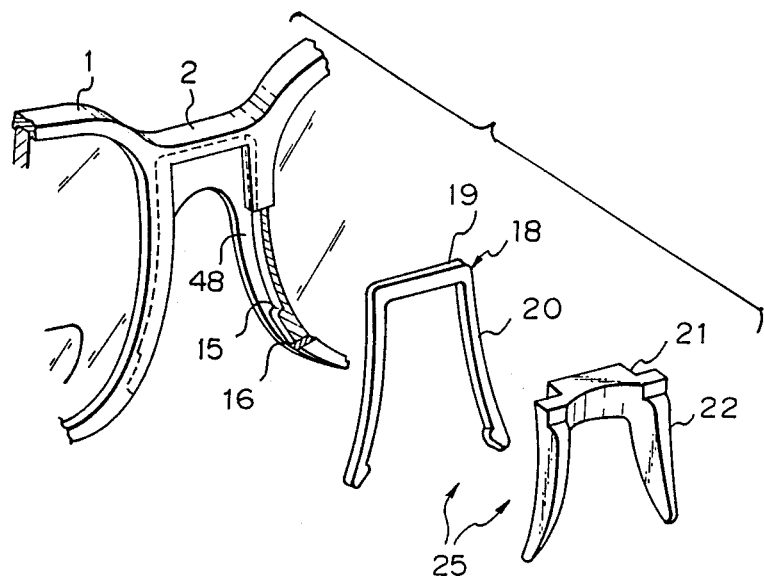
Figure 11A:
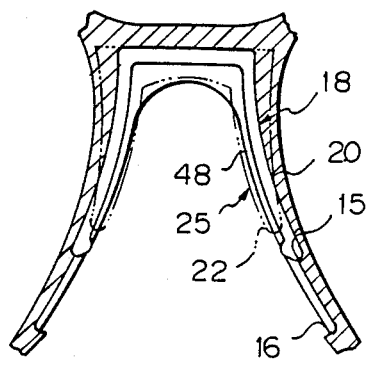
Figure 11B:
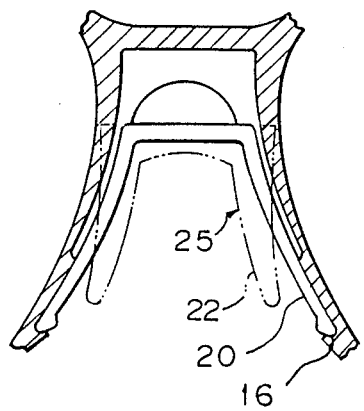
Figure 12:
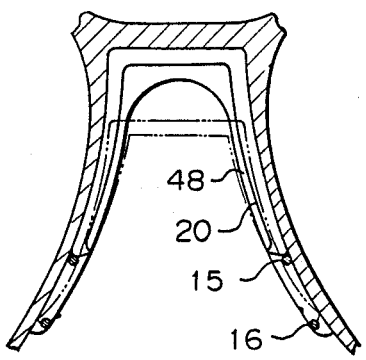
Figures 13A, 13B:
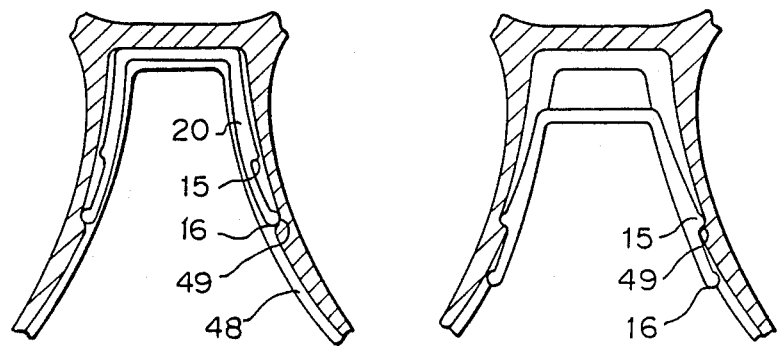

FIG. 5 presents sectional views illustrating the manner in which the first embodiment operates;

FIG. 6 is a perspective, exploded view of other components of the first embodiment;

FIG. 7 is a perspective view of the components of FIG. 6 in assembled form;

FIG. 8 is a sectionally fragmental view of the components of FIG. 7;

FIG. 9 presents views for describing the operation of the first embodiment;

FIG. 10 is a perspective, exploded view of the principal components of a second embodiment;

FIG. 11 presents sectional views illustrating the manner in which the second embodiment operates;

FIG. 12 is sectional view illustrating the manner in which a third embodiment operates; and FIG. 13 presents sectional views illustrating the manner in which a fourth embodiment operates.

As illustrated in the drawings, a frame for multi-focal spectacles in accordance with the invention comprises a main body and a nose-pad member 25 attached to the main body so as to be freely movable up and down. The main body is composed of left and right lens rims 1, 1, and a central bridge 2 connecting these two lens rims together at their inner sides. The main body is provided with opposing guides on the inner sides of the two lens rims 1, 1 and extending downwardly from the central bridge 2, the two guides gradually curving away from each other. The nose-pad member 25 comprises left and right nose-pads 22, 22, and left and right resilient pieces 20, 20 arranged on the front side of the nose-pads 22, 22 and curving gradually away from each other, the resilient pieces 22, 22 being integrally connected to the nose-pads 22, 22 at their upper portion. The left and right resilient pieces 20, 20 are attached to the main body along the left and right guides thereof and are movable up and down while being guided by the left and right guides. The resilient pieces 20, 20 consist of a resilient material and curve away from each other at their lower portions to a slightly greater extent than the left and right guides. By virtue of such an arrangement, the resilient pieces 20, 20 develop a small, outwardly directed elastic force when they are attached to the left and right guides. The resilient material forming the resilient pieces having the above-described shape need not necessarily develop an outwardly directed elastic force, for it is possible to adopt an arrangement in which the resilient pieces are attached to the guides by an inwardly directed elastic force. In the latter case, a clicking sound will be produced when the nose-pads are returned to the upper position, but the vertical operability of the nose-pads will not be affected. Further, since the nose-pads 22, 22 are connected to the resilient pieces 20, 20 at their upper portions, the nose-pads and resilient pieces move up and down together but there is no change in the spacing between the nose-pads because the positions at which the nose-pads contact the nose do not change. However, since the resilient pieces 22, 22 curve away from each other, moving them up and down causes a change in the spacing between the lower sides. In other words, the structure in which the nose-pads and resilient pieces are connected together at their upper portions allows the nose-pads and resilient pieces to undergo their own motion at sliding without influencing each other. Stop means for engaging the resilient pieces 20, 20 are provided at a plurality of vertically located positions between the resilient pieces 20, 20 and the left and right guides.

It is permissible for the left and right guides of the lens rims 1, 1 to be provided with guide grooves formed in the lens rims 1, 1, themselves. Alternatively, separate members can be attached to the lens rims 1, 1 to form the guide grooves. In the case where the guide grooves are provided, the resilient pieces 20, 20 of the nose-pad member 25 are fitted into the guide grooves.

Rather than providing the lens rims 1, 1 with guide grooves, it is permissible to form vertical projections on the lens rims 1, 1 and use these as guides. In such case, the resilient pieces 20, 20 would be formed to include grooves in which the projections are fitted, and guiding would be achieved with the projections and grooves in the mated state.

In embodiments to be described later, the resilient pieces 20, 20 and the nose-pads 22, 22 are fabricated separately and then integrated to form the nose-pad member 25. However, it is permissible to form these components integrally at the start. In either case, any structure for the nose-pad member 25 will suffice so long as the left and right nose-pads 22, 22 and the left and right resilient pieces 20, 20, which curve away from each other and are arranged on the front side of the nose-pad 22, are integrally connected at their upper portions.

The stop means provided between the resilient pieces 20, 20 and the guides for engaging the resilient pieces 20, 20 can have the form set forth in the embodiments described below, though it is possible to adopt expedients other than those shown in the embodiments. Though the stop means are provided in two stages, one above the other, in the embodiments, they can also be provided in three or more stages.

In addition, bifocal lenses are used in the embodiments described below. However, it goes without saying that successive multifocal lenses can be used, as well as multifocal lenses having three or more focal points.

In the embodiments described below, the arrangement is such that left and right side pieces 26, 26 can be tilted up and down. However, it is obvious that the invention can also be applied to ordinary multifocal spectacle frames in which the side pieces 26, 26 do not tilt up and down.

When the resilient pieces 20, 20 of the nose-pad member 25 are attached to the guides of the two lens rims 1, 1, the resilient pieces 20, 20 develop a small, outwardly directed elastic force. Since the two guides and two resilient pieces 20, 20 are shaped to gradually curve away from each other, the elastic force biases the resilient pieces 20, 20 downwardly.

When the nose-pad member 25 is being raised relative to the lens rims 1, 1, the resilient pieces 20, 20 are stopped at upper positions by the stop means to prevent the nose-pad member 25 from descending. As a result, the nose-pads 22, 22 are stably maintained at the raised positions. At such time the two lens rims 1, 1 will be in the lowered state, which is that for looking into the distance.

When it is desired to wear the spectacles with the lens rims 1, 1 in the raised state, the lens rims 1, 1 are lifted and the upper end of the nose-pad member 25 is pressed lightly in the vicinity of the eyebrows while the spectacles are being worn. When a light, downwardly acting force is applied to the nose-pad member 25, the resilient pieces 20, 20 are released from the upper positions at which they were locked. Since a downwardly directed biasing force is always acting upon the resilient pieces 20, 20, the latter begin to drop under the guiding action of the two guides at the instant the stopping engagement is overcome. The descent of the resilient pieces 20, 20 is stopped when they are locked at lower positions, in which state the resilient pieces 20, 20 are maintained in a stable manner. That is, the nose-pads 22, 22 are maintained stably at their lowered positions, in which state the lens rims 1, 1 are in the raised attitude. This is the state for close-up viewing.

To restore the spectacles to the state for looking into the distance, the lens rims 1, 1 are pressed down while the spectacles are being worn, thereby pressing the nose-pads 22, 22 against both sides of the nose. This causes the nose-pads 22, 22 to rise, as a result of which the resilient pieces 20, 20 also rise while being guided by the two guides. The spectacles assume the state for long-distance viewing when the resilient members 20, 20 are stopped at their upper positions.

If the stop means between the resilient pieces 20, 20 and the guides are provided at three locations one above the other, the resilient pieces 20, 20 can be engaged upon selecting whichever of the stop means suits the occasion. The spacing between the guides gradually narrows toward the upper end of the frame. Accordingly, when the nose-pad member 25 is raised, the spacing between the two resilient pieces 20, 20 gradually narrows so that the resilient pieces 20, 20 hold the nose-pad member. The elastic force spreading the resilient pieces 20, 20 apart gradually increases. This elastic force, which is maximized when the resilient pieces 20, 20 are stopped at their upper positions, biases the nose-pad member 25 downwardly. Consequently, when the resilient pieces are released from their upper positions, the nose-pad member 25 is dropped forcibly. In other words, the energy for lowering the nose-pad member 25 is stored up when the nose-pad member 25 is lifted.

When the nose-pads 22, 22 are pressed against both sides of the nose via the lens rims 1, 1 in order to lift the nose-pad member 25, the nose-pads 22, 22 contact the nose over a large surface area, and the lens rims 1, 1 need only be pressed downward by a natural operation while the spectacles are being worn. Accordingly, an unnatural sensation is not produced even if a strong force is applied. When the nose-pad member 25 is lowered, however the operation in which the lens rims 1, 1 are lifted and the upper end of the nose-pad member 25 is pressed in the vicinity of the eyebrows not only requires a considerably large amount of lifting but is also unnatural. Moreover, the area contacted by the nose-pad member 25 is small and the nose-pad member strikes the nose strongly. The unavoidable result is an odd sensation. It is therefore necessary that the nose-pad member 25 be lowered under a very small force. This is the reason for the design described above.

A first embodiment of the present invention will now be described with reference to FIGS. 1 through 9. In the first embodiment, the invention is applied to a frame for bifocal spectacles.

Figure 1:
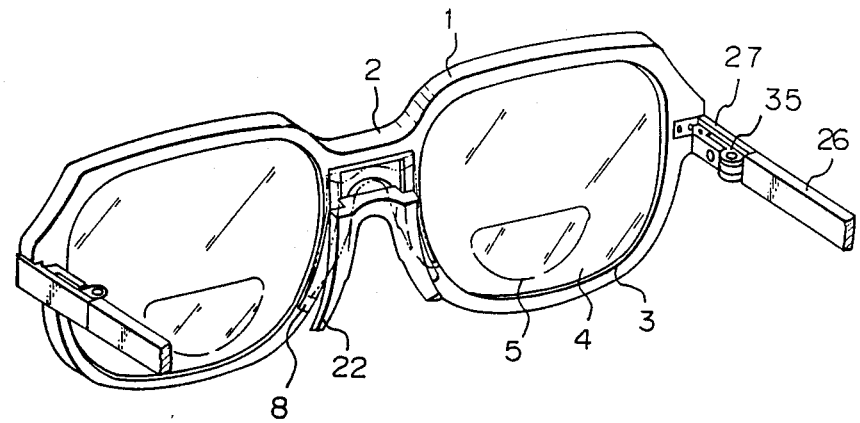
FIG. 1 is a perspective view illustrating a first embodiment of the invention.

With reference to FIG. 1, there is shown a spectacle frame which includes left and right lens rims 1, 1 and a central bridge 2 connecting the lens rims 1, 1 at the portions thereof slightly above center. Lenses 3, 3 are fitted into the lens rims 1, 1. These are bifocal lenses in which close-up lens segments 5, 5 are formed integral with distance lens segments at the lower part thereof. The portions described above are structually similar to those in bifocal spectacles well-known in the art.

As clearly shown in FIG. 4, the left and right lens rims 1, 1 have portions on their inner sides reduced in thickness up to a point below the bridge 2 to form a recess 6. The recess 6 is formed to provide an upwardly facing groove having an inverted V-shaped cross section at the portion where the bridge 2 is located. Small holes 7, 7 are drilled in the respective lens rims 1, 1 near the lower ends of the recess 6.

Figure 2:
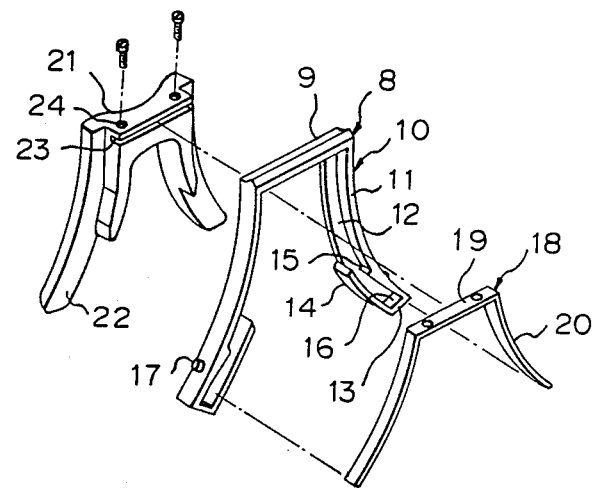
FIG. 2 is a perspective, exploded view of the principal components of the first embodiment.

A separate mounting piece 8 is provided. As clearly shown in FIG. 2, the mounting piece 8 is generally trapezoidal, with both sides thereof being curved, and is sized and configured to be exactly fitted into the recess 6. It should be noted that FIG. 2 shows the components of FIG. 4 as seen from the opposite side. The mounting piece 8 is made of a material such as plastic or metal and comprises a connecting bar 9 at its upper end, and guide pieces 10, 10 extending downwardly from both ends of the connecting bar 9 and gradually curving away from each other. The upper surface of the connecting bar 9 is formed to include a projecting rib having an inverted V-shaped cross section and shaped to be exactly fitted into an inverted V-shaped groove formed in the bridge 2. The left and right guide pieces 10, 10 respectively comprise side plates 11, 11 attached to extend downwardly from both ends of the connecting bar 9 and gradually curve away from each other, front plates 12, 12 attached to face inwardly from the front ends of the side plates 11, 11 in a state extending along the side plates 11, 11, short bottom plates 13, 13 attached inboard of the lower ends of the bottom plates 13, 13, and short, folded plates 14, 14 attached to point upwardly from the lower ends of the bottom plates 13, 13. A curving projection is formed on the inner surface of each of the side plates 11, 11 at a location slightly above their lower ends. The upper sides of these projections serve as upper stop portions 15, 15. The upper surface of the bottom plates 13, 13 serve as lower stop portions 16, 16. Pins 17, 17 sized to fit exactly into the holes 7, 7 in the lens rims 1, 1 are provided on the outer sides of the side plates 11, 11 near the lower ends thereof.

A resilient member 18 consisting of a material having resilience, such as plastic or metal, also has a trapezoidal shape, the sides of which gradually curve away from each other. The resilient member 18 comprises a laterally extending connecting bar 19 at its upper part, and resilient pieces 20, 20 extending downwardly from both ends of the connecting bar 19 and gradually curving away from each other. The resilient member 18 has a height somewhat less than that of the mounting piece 8. The resilient pieces 20, 20 have a greater spread at their lower portions than the side plates 11, 11 of the mounting piece 8. When the resilient member 18 is fitted inside the side plates 11, 11, therefore, a small elastic force acting in a direction that attempts to spread the resilient pieces 20, 20 apart is produced. The connecting bar 19 is provided with two small holes.

A member comprises an upper connecting bar 21, and nose-pads 22, 22 extending downwardly from the connecting bar 21 and curving away from each other. The connecting bar 21 is formed to have slightly increased thickness at the central portion thereof on its rear side, a horizontal groove 23 is formed in the thickened portion near its upper end, and small holes 24, 24 are drilled in the thickened portion above the groove 23 until the groove is reached.

The components shown in FIG. 2 are assembled as follows: First, the resilient pieces 20, 20 of the resilient member 18 are squeezed together slightly and fitted into the side plates 11, 11 of the mounting piece 8. This produces a small elastic force acting to spread the resilient pieces 20, 20 apart. This elastic force also acts in a direction to urge the resilient member 18 downward. Though the resilient member 18 is thus urged, the lower ends of the resilient pieces 20, 20 butt against the lower stop portions 16, 16, whereby the downward movement of the resilient member 18 is checked. In this state the connecting bar 19 of the resilient member 18 is fitted into the groove 23 of the member provided with the nose-pads 22, 22, and small screws are screwed into the holes 24, 24 to secure the resilient member 18 in place. The result is the assembly shown in FIG. 3. Thus, the left and right nose-pads 22, 22 and the left and right resilient pieces 20, 20 are integrally connected at an upper position to form a nose-pad member 25.

Figure 3:
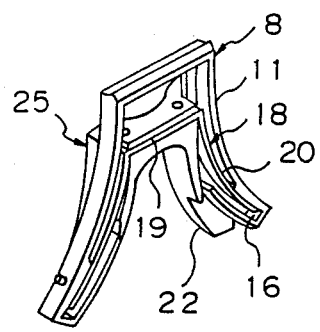
FIG. 3 is a perspective view, of the components of FIG. 2 in assembled form.
Figure 4:
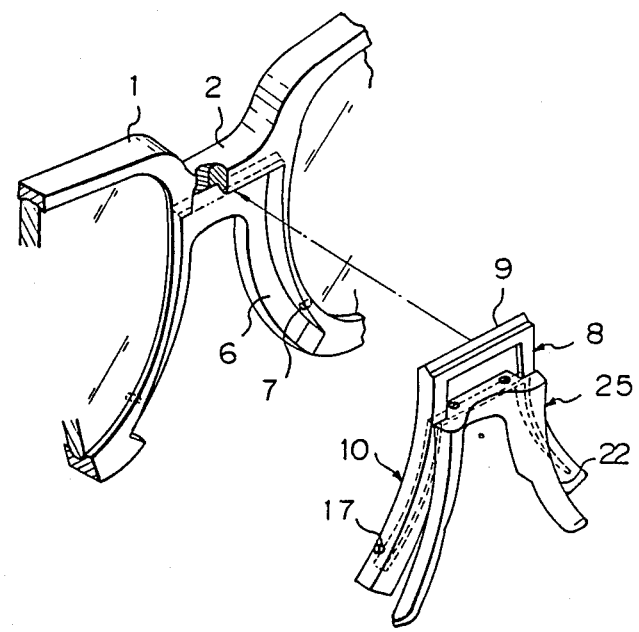
FIG. 4 is a perspective view of the first embodiment prior to assembly.

FIG. 4 shows the assembly of FIG. 3 when viewed from the opposite side. The rib on the upper surface of the connecting bar 9 is fitted into the groove of the central bridge 2 while the lower ends of the guide pieces 10, 10 of mounting piece 8 are squeezed slightly to reduce the spacing therebetween. Next, the force squeezing the guide pieces 10, 10 together is released, whereby the pins 17, 17 fit themselves into the holes 7, 7 of the lens rims 1, 1. The mounting piece 8 is thus snugly mounted in the recess 6. The result is as shown in FIG. 1. The resilient pieces 20, 20 of the resilient member 18 are capable of being moving vertically in the guide pieces 10, 10, and the front plates 12, 12 and folded plates 14, 14 of the guide pieces 10, 10 assure that the resilient pieces 20, 20 will not slip out.

The arrangement is such that the resilient member 18 can be moved vertically together with the nose pads 22, 22 and stopped at an upper position or lower position as desired. This operation will now be described on the basis of FIG. 5. The state shown in FIG. 1 corresponds to that illustrated in (A) of FIG. 5. When the nose-pad member 25 is lifted from the state shown in FIG. 5(A), the resilient pieces 20, 20 rise while being guided by the guide pieces 10, 10 of mounting piece 8. Since the spacing between the side plates 11, 11 of the guide pieces 10, 10 gradually decreases as the resilient pieces 20, 20 rise, the spacing between the lower portions of the resilient pieces 20, 20 also gradually decreases. As a result, the elastic force developed by the lower portions of the resilient pieces, namely the force acting to spread them apart, gradually increases. When the upper end of the nose-pad member 25 butts against the upper portion of the mounting piece 8 to check any further upward movement, the lower ends of the resilient pieces 20, 20 occupy positions immediately above the upper stop portions 15, 15 of the side plates 11, 11. When the force lifting the nose-pad member 25 is released, a force attempting to spread the resilient pieces 20, 20 apart is stored up. Though this force attempt to move the resilient pieces 20, 20 in a direction, namely downward, which would widen the spacing between the side plates 11, 11, the lower ends of the resilient pieces 20, 20 immediately engage the upper stop portions 15, 15, so that downward movement of the resilient pieces 20, 20 is checked. This state of engagement is as shown in (B) of FIG. 5, in which the nose-pads 22, 22 are supported at their upper positions.

To lower the nose-pad member 25, it will suffice to apply a downwardly directed force to the nose-pad member 25. This force need only be a weak force slightly greater than that which holds the lower ends of the resilient pieces 20, 20 in engagement with the upper stop portions 15, 15. At the instant this weak force releases the lower ends of the resilient pieces 20, 20 from the upper stop portions 15, 15, the resilient pieces 20, 20 are lowered in the guide pieces 10, 10 by the force attempting to spread the resilient pieces 20, 20 apart. Re-engagement is achieved when the lower ends of the resilient pieces 20, 20 butt against the lower stop portions 16, 16. This restores the state shown in (A) of FIG. 5, in which the nose-pads 22, 22 are supported at their lower positions.

Next, the mechanism for mounting the side pieces 26, 26 attached to rims 1, 1 at their outer edge will be described with reference to FIGS. 6 through 8. FIG. 6 is an exploded perspective view showing the components of the mounting mechanism. The front end of a support 27 is rigidly attached to the outer side of each rim 1. The rear edge of the support 27 is cut in a curve, and a hole 28 is drilled through the support 28. A holder 29 of generally L-shaped configuration is formed integral with the support 27 on the inner side thereof. As shown in FIG. 8, the portion connecting the holder 29 to the support 27 has a generally rectangular cross section. At a position forward of and above the holder 29, the connection portion has a rear face serving as a vertical butting face 20 and a lower face serving as a horizontal abutting face 31. The holder 29 is provided with a hole 32 in register with the hole 28 in the support 27. A vertically extending female screw hole 33 is drilled in the connecting portion of the holder 29, and an adjusting screw 34 is screwed into the female hole 33.

A separate link 35 is provided. The forward end of the link 35 is formed to include a forwardly extending projection 36 on its lower part. The projection 36 has a slightly inclined upper face 37. A vertical step 38 is formed on the upper side of the root of the projection 36. The rear end of the link 35 is provided with two slightly vertically spaced rings 39, 39 one above the other. The upper ring 39 is provided with a hole 40, and the lower ring 39 is provided with a female screw hole 41. The link 35 is provided with a horizontally extending hole 42 at its central portion.

A small ring 43 is attached to the forward end of the side piece 26 on its inner side, and the ring 43 has a hole 44.

To assemble the components shown in FIG. 6, first the link 35 is fitted between the support 27 and the holder 29, the hole 28 in the support 27, the hole 42 in the link 35, and the hole 32 in the holder 29 are aligned, a nut 45 is then inserted into the support 27 from the hole 28, and a screw 46 is screwed into the nut 45 upon being passed through the hole 32 in the holder 29. Next, the ring 43 of the side piece 26 is fitted between the rings 39, 39 of the link 35, and the hole 44 in ring 43, the hole 40 in the upper 39 and the female screw hole 41 are aligned. Thereafter, a screw 47 is screwed into the female screw hole 41 of the lower ring 39 upon being passed through the hole 40 in the upper ring 39, thereby completing the assembly operation. The result is as shown in FIG. 7.

The side piece 26 is rotated and folded inwardly about the fulcrum formed by the screw 47, and can be rotated vertically about the fulcrum formed by the nut 45. When the side piece 26 is rotated upwardly, as shown in FIG. 8, the side piece 26 and link 35 rotate upwardly together until the step 38 of link 35 butts against the vertical abutting face 30 of the holder 29, at which point rotation stops. When the side piece 26 is rotated downwardly, the inclined face 37 on the projection 36 of link 35 comes into butting contact with the horizontal butting face 31 of the holder 29 or the lower end of the adjusting screw 34 screwed into the female hole 33. The angular range through which the side piece 26 can be rotated in the downward direction is regulated by adjusting the amount by which the adjusting screw 34 is screwed into the hole 33.

The spectacles described above are used as illustrated in FIG. 9. First, if the distance lens segments 4, 4 are to be used, the spectacles are worn with the side pieces 26, 26 rotated upwardly to raise the nose-pads 22, 22, as depicted in (A) of FIG. 9. In this state the lower ends of the resilient pieces 20, 20 of resilient member 18 are engaged with the upper stop portions 15, 15 of the guide pieces 10, 10, so that the nose-pads 22, 22 are stably maintained at their upper positions. Further, the lens rims 1, 1 are supported in the lowered attitude, so that the distance lens segments 4, 4 are substantially centered on the wearer's line of vision. Moreover, the line of vision for distance viewing and the distance lens segment 4 intersect substantially at right angles.

When an object close at hand is viewed as for reading or other purposes, the lower sides of the lens rims 1, 1 are pulled backward. The supports 27, 27 fold relative to the side pieces 26, 26 about the nuts 45, 45 and screws 46, 46, so that the lens rims 1, 1 are tilted slightly forward. At the same time, the lens rims 1, 1 are lifted and the upper end of the nose-pad member 25 is pressed lightly in the vicinity of the eyebrows. When this light force acts upon the nose-pad member 25 in the downward direction, the lower ends of the resilient pieces 20, 20 of resilient member 18 part from the upper stop portions 15, 15 of the mounting piece 8. Owing to the elastic force spreading the resilient pieces 20, 20 away from each other, the resilient pieces 20, 20 descend until their lower ends butt against the lower stop portions 16, 16, whereby descent of the resilient pieces 20, 20 is checked. The nose-pads 22, 22 are thus supported at their lower positions. When the spectacles are worn in this state, the lens rims 1, 1 are supported in a slightly lifted and tilted-forward attitude, as shown in (B) of FIG. 9.

The close-up lens segments 5, 5 are thus lifted slightly and brought close to the center of the visual field and close to the wearer's eyes. Moreover, since the lens rims 1, 1 are tilted slightly forward, the downwardly directed line of vision intersects the close-up lens segments 5, 5 substantially at right angles.

To restore the state in which the distance lens segments 4, 4 are used, the lower sides of the lens rims 1, 1 are pushed forward to bring the supports 27, 27 and side pieces 26, 26 into perfect alignment. At the same time, the lens rims 1, 1 are pushed downwardly to urge the nose-pads 22, 22 against the sides of the wearer's nose. The nose-pads 22, 22, which are subjected to an upwardly acting force by the sides of the nose, rise while the elastic pieces 20, 20 of the elastic member 18 are guided in the guide pieces 10, 10 of the mounting piece 8. This is accompanied by elevation of the resilient member 18. When this upward movement is checked, the wearer stops pressing the nose-pads 22, 22 against the nose. Though a force is produced in the resilient member 18 that attempts to move the resilient member 18 downward, downward movement is checked when the lower ends of the resilient pieces 20, 20 butt against the upper stop portions 15, 15.

A second embodiment of the present invention will now be described with reference to FIGS. 10 and 11. As clearly shown in FIG. 10, the inner sides of the left and right lens rims 1, 1 are provided with guide grooves 48, 48 the upper parts of which extend to the lower half portion of the bridge 2. The lower ends of the guide grooves 48, 48 are formed to include respect step portions serving as lower stop portions 16, 16. Step portions are formed at positions above the lower ends of the guide grooves and serve as upper stop portions 15, 15.

A resilient member 18 substantially similar in shape to that of the first embodiment is provided. The resilient member 18 is formed to have a shape and size that will allow it to fit exactly into the guide grooves 48, 48. However, the lower portions of the resilient pieces 20, 20 that gradually curve away from each other have a slightly greater spread than do the guide grooves 48, 48. When the resilient pieces 20, 20 are fitted into the guide grooves 48, 48, therefore, a small elastic force is produced in the resilient pieces 20, 20. A member formed to include nose-pads 22, 22 and having substantially the same shape as that of the first embodiment is provided. The connecting bar 19 of the resilient member 18 is attached to the front side of the connecting bar 21 as by adhesive or screws to integrate the resilient member 18 and the member having the nose-pads, thereby forming the nose-pad member 25.

When the resilient pieces 20, 20 of the resilient member 18 are fitted into the guide grooves 48, 48 and the nose-pad member 25 is lifted, the state shown in (A) of FIG. 11 results. The lower ends of the resilient pieces 20, 20 are engaged with the upper stop portion 15, 15, and the nose-pads 22, 22 are supported at their upper positions. When a weak force is applied to the nose-pad member 25, the resilient pieces 20, 20 descend, their lower ends engage the lower stop portions 16, 16, and the nose-pads 22, 22 are supported at their lower positions, as shown in (B) of FIG. 11.

A third embodiment of the invention will now be described with reference to FIG. 12. In the second embodiment, step portions are formed in the guide grooves 48, 48 to serve as the upper stop portions 15, 15 and lower stop portions 16, 16. In the third embodiment, however, pins are implanted at these locations to form the upper stop portions 15, 15 and lower stop portions 16, 16.

A fourth embodiment will now be described with reference to FIG. 13. In the first through third embodiments, the lens rims 1, 1 are provided with the upper stop portions 15, 15 and lower stop portions 16, 16 in order to engage the resilient pieces 20, 20 at each of two locations, one situated above the other. In the fourth embodiment, step portions 49, 49 are formed in the guide grooves 48, 48 at only one location, upper stop portions 15, 15 are formed at the lower ends of the resilient pieces 20, 20, and lower stop portions 16, 16 are formed on the resilient pieces 20, 20 at positions slightly above the lower ends thereof. This makes an operation similar to that described above possible, as should be apparent from FIG. 13.

As is obvious from the description given above, the multifocal spectacle frame according to the invention enables the lens rims 1, 1 to be moved vertically, while the spectacles are being worn, by pressing the nose-pads 22, 22 against the sides of the nose or by pressing the upper end of the nose-pad member 25 in the vicinity of the eyebrows. Accordingly, the spectacles can be manipulated in a very simple manner.

In addition, forces are produced in the two resilient pieces 20, 20 of nose-pad member 25 that bias them downward at all times, these forces serving to retain the resilient pieces 20, 20 at the upper or lower stop positions as desired. As a result, the spectacles can be operated in a sure manner.

Further, since the two resilient pieces 20, 20 are fitted snugly in the lens rims 1, 1 by these elastic forces, the nose-pad member 25 is attached integrally to the main body of the spectacle frame. When the spectacle frame is worn, therefore, the sensation is no different from that of an ordinary spectacle frame.

As many apparently widely different embodiments of the present invention can be made without departing from the spirit and scope thereof, it is to be understood that the invention is not limited to the specific embodiments thereof except as defined in the appended claims.

What is claimed is:

1. A frame for multifocal spectacles, comprising:
   left and right lens rims for mounting left and right multifocal lenses therein;
   a bridge connected between the inner sides of respective lens rims;
   left and right guide portions on the inner sides of said left and right lens rims and in spaced opposed positions and having guide means forming a part thereof and extending downwardly from said bridge and gradually curving away from each other and each having a stop member therealong.
   a nose pad member having left and right nose pads;
   left and right flexible resilient pieces integrally connected to said left and right nose pads, respectively, at upper portions thereof, said left and right resilient pieces gradually curving downwardly and away from each other with a somewhat greater degree of curvature than the curvature of said guide means and having the lower ends thereof resiliently engaged in and being guided by said guide means, said resilient pieces being under tension for producing a small outward resilient force against said guide means for holding said resilient pieces in said guide means; and
   a plurality of stop means spaced along said left and right resilient pieces for engaging said stop member for stopping said nose pad member at different positions along said guide means.

* * * * *